US006074079A

United States Patent [19]

Yanagihara et al.

[11] Patent Number: 6,074,079

[45] **Date of Patent: *Jun. 13, 2000**

[54] VEHICLE-LAMP

[75] Inventors: Hirokazu Yanagihara; Satoshi Ogawa, both of Shizuoka, Japan

[73] Assignee: Koito Manufacturing Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/037,055

[22] Filed: Mar. 9, 1998

[30] Foreign Application Priority Data

Mar. 10, 1997 [JP] Japan .................................... 9-072735

[51] Int. Cl.[7] ........................................................ B60Q 1/00

[52] U.S. Cl. ........................... 362/509; 362/544; 362/311

[58] Field of Search .................................... 362/521, 509, 362/327, 310, 311, 235, 236, 242, 243, 244, 245, 246, 543, 544, 361

[56] References Cited

U.S. PATENT DOCUMENTS

| | | | |
|---|---|---|---|
| 5,394,310 | 2/1995 | Iwasaki | 362/309 |
| 5,546,284 | 8/1996 | Harada . | |
| 5,582,481 | 12/1996 | Natsume . | |
| 5,707,132 | 1/1998 | Ooki et al. | 362/311 |

*Primary Examiner*—Thomas M. Sember
*Attorney, Agent, or Firm*—Sughrue, Mion, Zinn, Macpeak & Seas, PLLC

[57] ABSTRACT

A vehicle lamp having a resin lens includes: an elongated lens body including a flat portion large in radius of curvature and a curved portion small in radius of curvature with respect to the longitudinal direction of the lens body; and a peripheral flange formed along the peripheral of the lens body, wherein the curve portion is smaller in wall thickness than the flat portion.

19 Claims, 5 Drawing Sheets

VEHICLE-LAMP

BACKGROUND OF INVENTION

This invention relates to a vehicle lamp with a long curved resin lens.

The lens of a vehicle lamp generally has: a lens body; and a peripheral flange formed around the periphery of the lens body. Usually, the lamp body is so shaped because of a vehicle body design that its vertical width is small, and outside portion (as viewed in the direction of vehicle width) is curved along the vehicle body configuration. This long curved lens is generally a resin lens so that it can be formed with ease.

Even in the case where such a long curved resin lens is employed, the lens body is uniform in thickness as a whole similarly as in the case of an ordinary lens. Hence, the resultant vehicle lamp suffers from the following problems:

The above-described resin lens is generally formed by injection molding. Immediately after the injection molding operation, the behavior of the resin lens is as follows: That is, as shown in FIG. 5(*a*), in the metal mold 2, the peripheral flange 130 which is large in contact area with the metal mold 2 is firstly solidified, and thereafter the lens body 128 is solidified. During the solidification, the resin contracts. As a result, a compression stress occurs with the lens body 128. The compression strain deformation is considerably large in the longitudinal direction of the lens body 128.

As shown in FIG. 5(*b*), the flat portion 128A of the lens body 128, which is large in the radius of curvature, substantially causes no problem even if the aforementioned compression strain occurs with the lens body. On the other hand, the curved portion 128B of the lens body 128, which is small in the radius of curvature, causes problems. That is, when the aforementioned compression strain occurs with the lens body, the curved portion 128B is deformed in the direction in which the radius of curvature is increased (or in the direction of the arrow). Because of this deformation, the peripheral flange 130 formed along the periphery of the lens body is deformed downwardly in such a manner that it is moved from its correct position. The peripheral flange 130 is provided for the sealing of the lamp body. If the peripheral flange 130 is deformed in the above-described manner, then its function is not sufficiently performed.

The above-described difficulty accompanies not only with a long curved resin lens which is elongated horizontally but also with a long curved resin lens which is elongated vertically.

SUMMARY OF INVENTION

In view of the foregoing, an object of the invention is to provide a vehicle lamp with a long curved resin lens in which its lens body is prevented from being deformed upwardly.

According to the present invention, there is provided a vehicle lamp having a resin lens which includes: an elongated lens body including a flat portion large in radius of curvature and a curved portion small in radius of curvature with respect to the longitudinal direction of the lens body; and a peripheral flange formed along the peripheral of the lens body, wherein the curve portion is smaller in wall thickness than the flat portion.

The term "elongated" as herein used is intended to mean that the ratio of a longitudinal length to a length perpendicular to the longitudinal length is at least 2:1.

The terms "large in the radius of curvature", and "small in the radius of curvature" as herein used are intended to mean relative values in comparison of the flat portion and the curved portion.

The fact that the curved portion is "smaller in wall thickness" than the flat portion means that the reference wall thickness is set to a small value. The term "reference wall thickness" as herein used means the wall thickness itself in the case where the lens body is a plain lens. And, in the case where the lens body has lens steps, the term "reference wall thickness" means the wall thickness of a part of the lens step which is smallest in wall thickness. In this case, the term "wall thickness" is a value which is determined as a normal direction wall thickness.

As was described above, in the vehicle lamp of the invention, the lens body of the resin lens is elongated, and is a continuity of the flat portion large in the radius of curvature and the curved portion small in the radius of curvature with respect to the longitudinal direction. However, since the curved portion is smaller in wall thickness than the flat portion, the following effects or merits are provided:

After the injection molding operation, in the metal mold, the lens body of the resin lens is solidified after the peripheral flange; and in the lens body, the flat portion relatively large in the radius of curvature is solidified after the curved portion relatively small in the radius of curvature. Therefore, the compression stress which occurs with the lens body as the resin contracts when solidified, is affected by the resin contraction only which occurs when the curved portion is solidified and is not affected by the resin contraction which occurs when the flat portion is solidified.

Hence, the compression strain, in the longitudinal direction, of the curved portion which is due to the above-described compression stress is small, and the deformation of the curved portion in the direction in which the radius of curvature is increased is minimized. This feature prevents the peripheral flange, on the side of the curved portion, of the lens body from being deformed in such a manner that it is moved upwardly from its predetermined position.

In the flat portion which is solidified after the curved portion, the compression strain deformation, in the longitudinal direction, which is due to the compression stress is relatively large. However, since the radius of curvature, in the longitudinal direction, of the flat portion is large, even when such a compression strain occurs therewith, the lens body is scarcely changed in configuration, and the peripheral flange is never deformed upwardly.

As was described above, in the vehicle lamp with the long curved resin lens according to the invention, the lens body is effectively prevented from being deformed upwardly. Especially, in the case where the peripheral flange is formed for the sealing of the lamp body and the resin lens, the sealing function is performed sufficiently.

It goes without saying that the lens body may be formed in such a manner that the flat portion is continuous directly to the curved portion. Not only that, the middle wall thickness portion which is smaller in wall thickness than the flat portion and larger in wall thickness than the curved portion may be provided between the flat portion and the curved portion. In this case, the abrupt change in compression stress between the flat portion and the curved portion is released. This feature increases the mechanical strength of the resin lens.

In the vehicle lamp, the middle wall thickness portion is gradually smaller in wall thickness towards the end of the curved portion from the end of the flat portion. In this case the abrupt change in compression stress between the flat portion and the curved portion is more effectively released. In addition, the formation of the middle wall thickness portion prevents from the formation of a step between the flat portion and the curved portion, or minimizes the formation of the step. This feature improves the external appearance of the vehicle lamp.

If the curved portion is smaller in wall thickness than the flat portion, the value of wall thickness of the former is not particularly limited. In the case where the wall thickness of the curved portion is less than 90% of the wall thickness of the flat portion, the amount of deformation of the curved portion in the direction in which the radius of curvature in the longitudinal direction increases becomes substantially zero.

As was described above, the value of wall thickness of the curved portion is not particularly limited. In the case where, the wall thickness of the flat portion is at least 2 mm and at most 4 mm, then the lens body is balanced in wall thickness distribution as a whole.

After the injection molding operation, in the metal mold, the lens body is solidified after the peripheral flange. This is because the peripheral flange is large in contact area with the metal mold than the lens body. In the event that the end portion of the peripheral flange is smaller in wall thickness than the curved portion, the peripheral flange is liable to be more quickly solidified, and therefore the construction of the embodiment is effective in the formation of a vehicle lamp.

DETAILED DESCRIPTION OF PREFERRED EMBODIMENTS

A preferred embodiment of the invention will be described with reference to the accompanying drawings.

Figure 1:
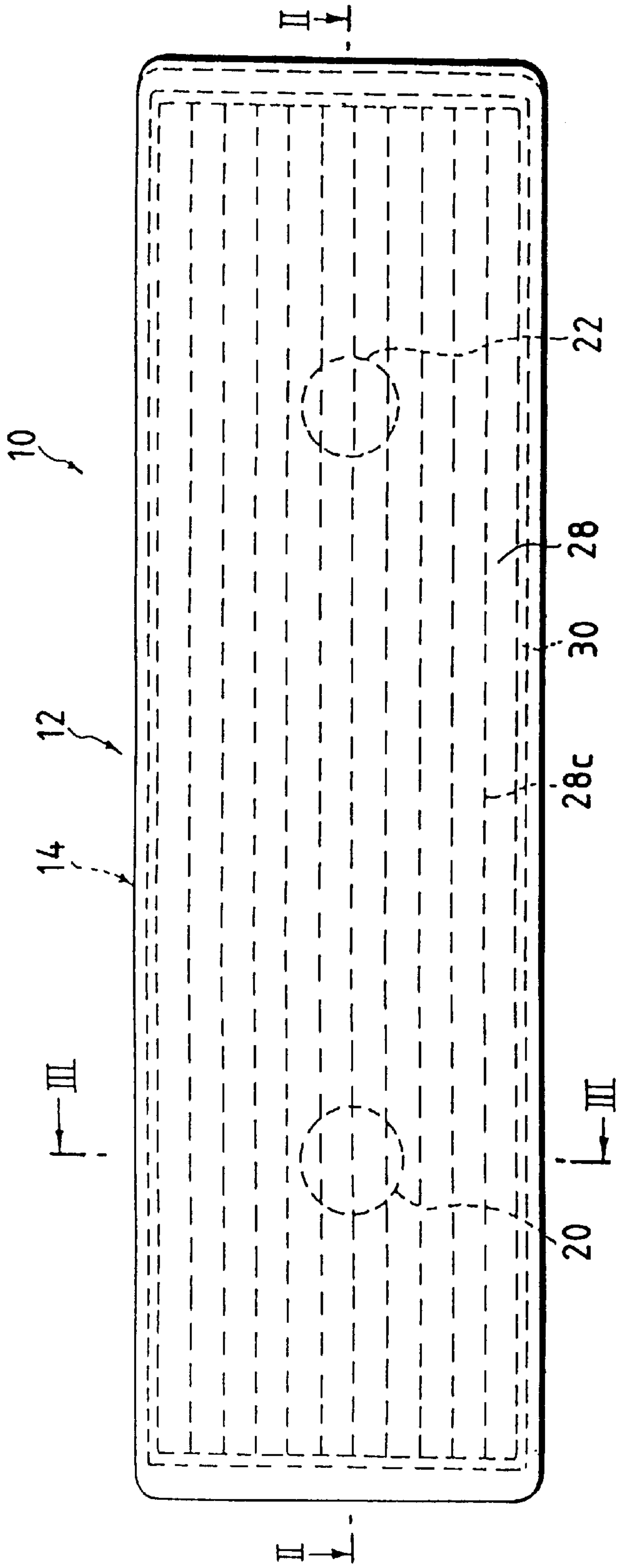
FIG. 1 is a front view showing a vehicle lamp, which constitutes an embodiment of the invention.
Figure 2:
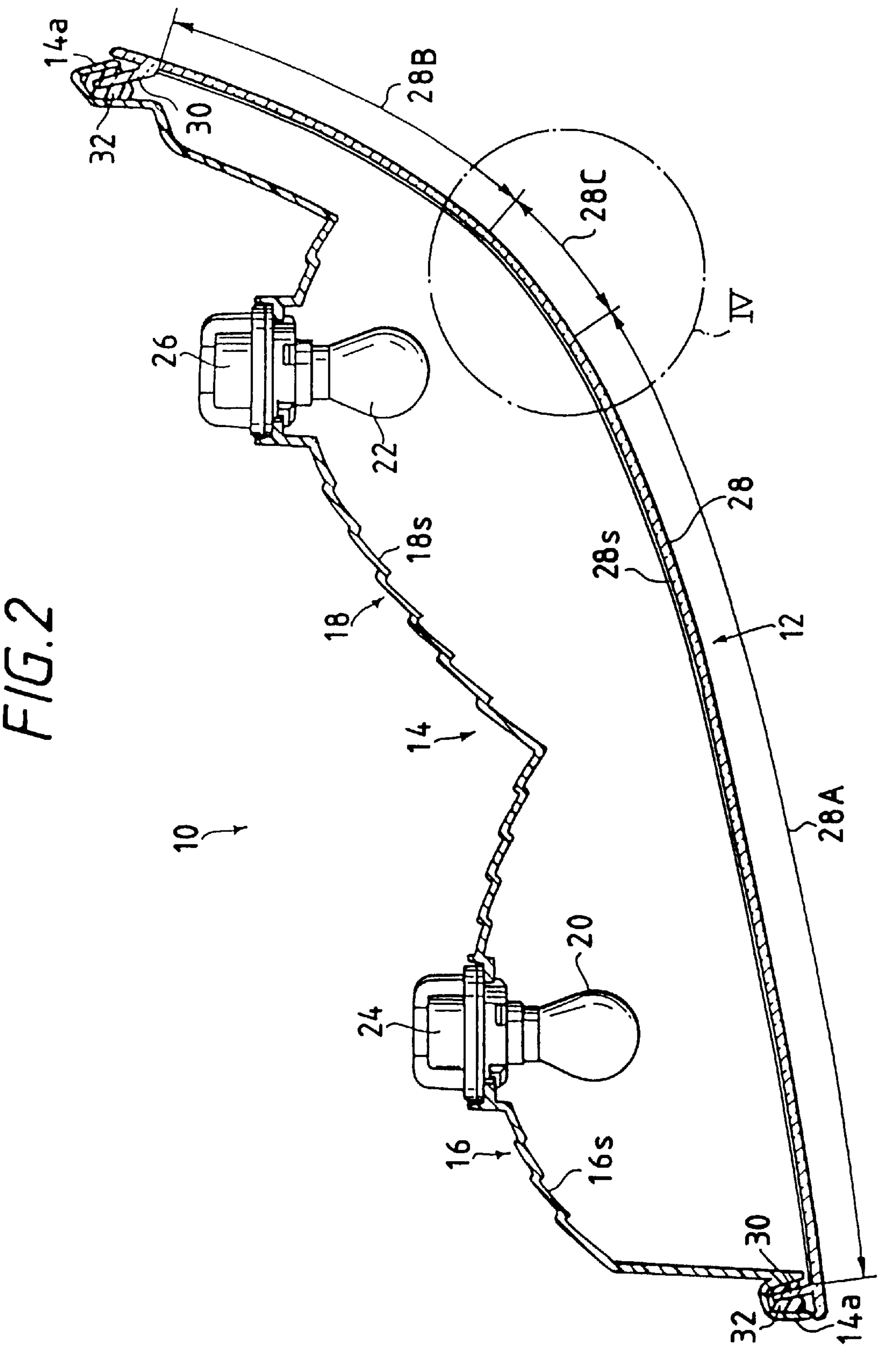
FIG. 2 is a sectional view taken along line II—II in FIG. 1.
Figure 3:
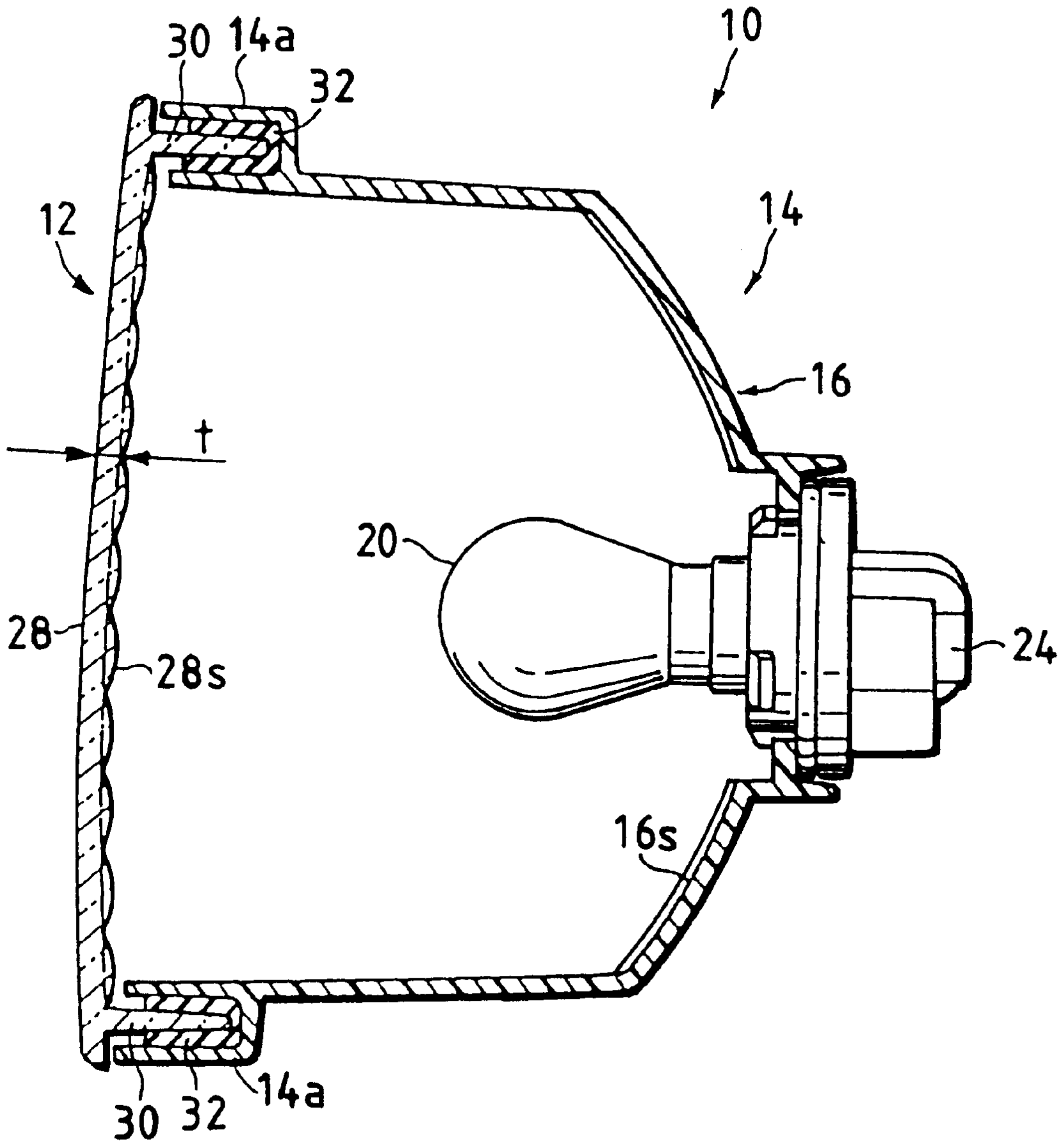
FIG. 3 is also a sectional view taken along line III—III in FIG. 1.

FIG. 1 is a front view of a vehicle lamp, the embodiment of the invention. FIG. 2 is a sectional view taken along line II—II in FIG. 1, and FIG. 3 is also a sectional view taken along line III—III in FIG. 1.

As is seen from those figures, the vehicle lamp 10 is a tail and stop lamp installed on the rear end portion of the vehicle body (for the right side in this embodiment). The vehicle lamp 10 comprises: a resin lens 12, and a lamp body 14 provided behind the resin lens 12 (being located in the rear of the vehicle lamp, and in front of the vehicle body), and its front view is rectangular being elongated horizontally.

The lamp body 14 has two reflector sections 16 and 18. The reflector sections 16 and 18 have a plurality of reflecting surface elements 16*a* and a plurality of reflecting surface elements 18*a,* respectively, which are of vertical stripe patterns. Light source bulbs 20 and 22 are inserted through sockets 24 and 26 into the tops of the reflector sections 16 and 18, respectively. The lamp body has a sealing groove 14*a* in the periphery.

The resin lens 12 is of synthetic resin, and formed by injection-molding. The resin lens 12 comprises: an elongated lens body 28; and a peripheral flange 30 formed along the periphery of the lens body 28. That is, the resin lens 12 extends outwardly as viewed in the direction of vehicle width and then curves backwardly. The peripheral flange 30 is inserted into the groove 14*a* of the lamp body 14 which is filled with an adhesive agent 32, so that the resin lens 12 is fixedly secured to the lamp body 14.

As shown in FIG. 3, in the inner surface of the lens body 28, the region inside the peripheral flange 30 has a plurality of lens steps 28*s* in such a manner that the latter are laid like a horizontal stripe pattern. In FIG. 3, the two-dot chain line indicates the reference inner surface position of the lens body 28 which is a reference in the formation of the lens steps 28*s*. The wall thickness (or reference thickness) t between the reference inner surface position and the surface position of the lens body 28 as viewed in the direction of the normal is the wall thickness at the border lines between the adjacent lens steps 28*s* because each of the lens steps 28*s* is a cylindrical lens.

As shown in FIG. 2, the portion of the lens body 28 which is located inwardly as viewed in the direction of vehicle width is a flat portion 28A which is large in the radius of curvature with respect to the longitudinal direction (or horizontal direction), while the portion of the lens body 28 which is located outwardly as viewed in the direction of vehicle width is a curved portion 28B which is small in-the radius of curvature. The flat portion 28A is continuous to the curved portion 28B through a middle wall thickness portion 28*c* (which is formed between those portions 28A and 28B).

Figure 4:
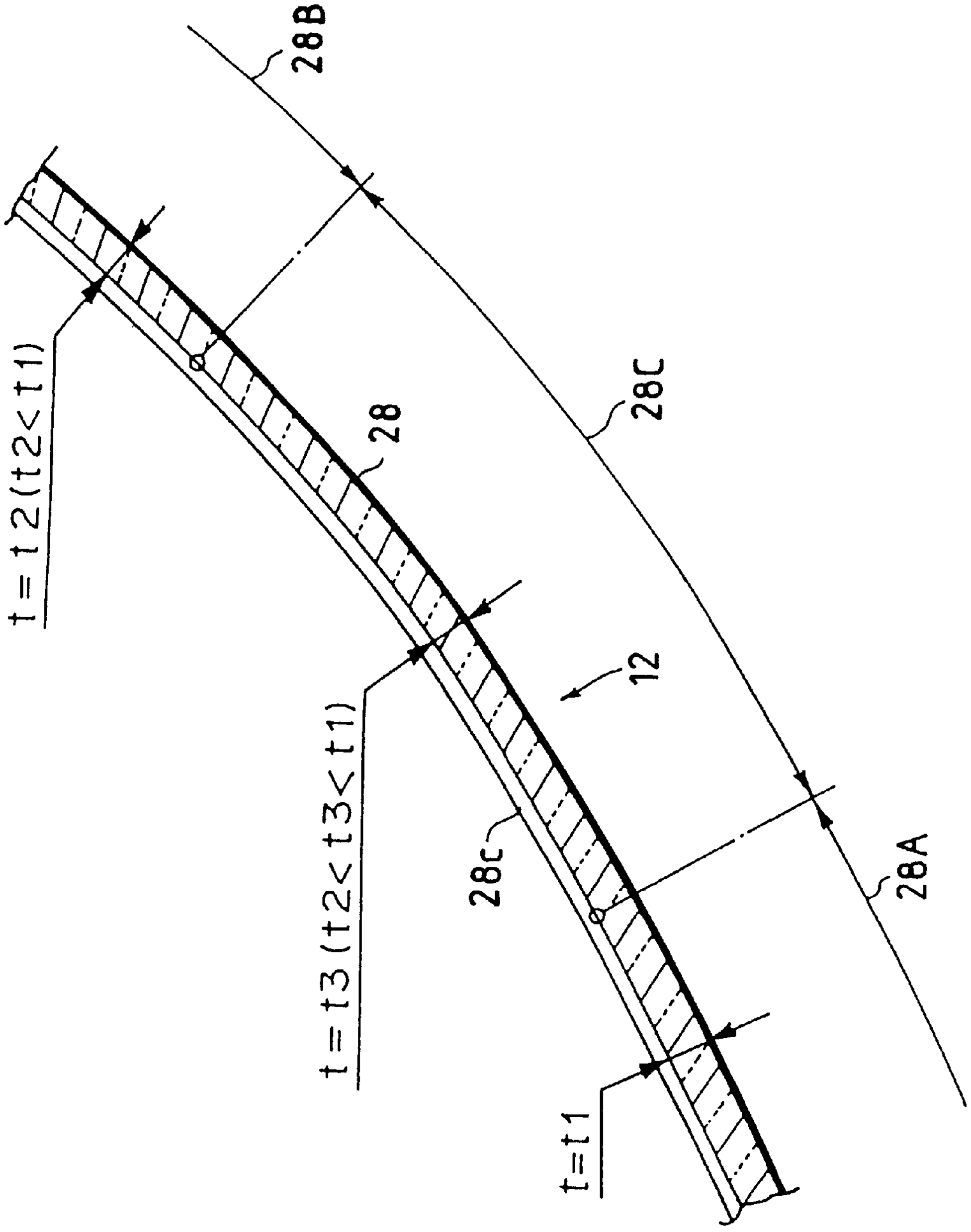
FIG. 4 is an enlarged diagram of the part IV in FIG. 2.
Figure 5A:
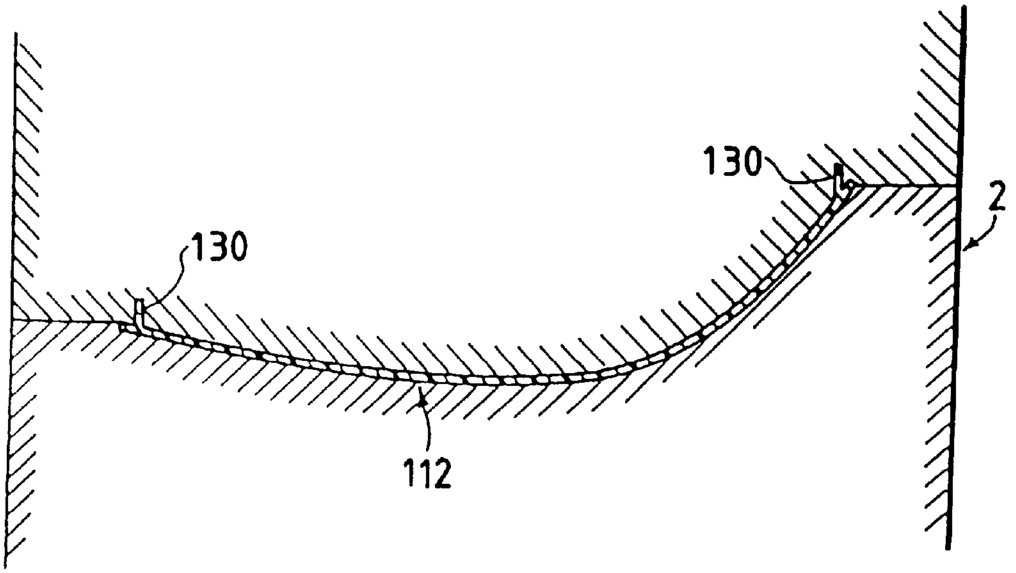
FIGS. 5(*a*) and 5(*b*) show a conventional vehicle lamp.
Figure 5B:
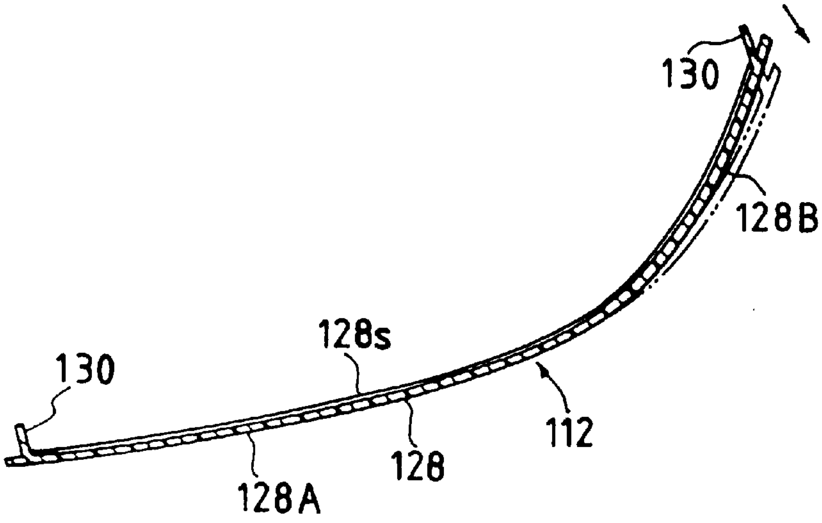

As shown in FIG. 4, which is an enlarged diagram of the part IV in FIG. 2, the reference wall thickness t of the lens body 28 is as follows: In the case where the reference wall thickness t of the flat portion 28A represents as t1 (t=t1), t=t2 (t2<t1) in the curved portion 28B, and to t=t3 (t2<t3<t1) in the middle wall thickness portion 28C. The concrete values of the reference wall thicknesses t1 and t2 are as follows: t1=3.5 mm, and t2=2.5 mm. The reference wall thickness t3 is gradually changed, from t1 to t2, from the end of the middle wall thickness portion 18*c* which is on the side of the flat portion 28A towards the end of the curved portion 28B. The wall thickness of the end portion of the peripheral flange 30 is 1.5 mm.

As was described above, in the vehicle lamp 10 of the embodiment of the present invention, the lens body 18 of the resin lens 12 is elongated, comprising the flat portion 28A large in the radius of curvature with respect to the longitudinal direction, and the curved portion 28B small in the radius of curvature which is continuous to the flat portion 28A. And, the curved portion 28B is smaller in wall thickness than the flat portion 28A. Hence, the vehicle lamp of the invention has the following effects:

That is, the resin lens 12 injection-molded shows the following behavior in the metal mold: After the peripheral flange 30 is solidified, the lens body 28 is solidified. In this case, after the curved portion 28B relatively small in wall thickness is solidified, the flat portion 28A relatively large in wall thickness is solidified. Therefore, as the resin contracts during solidification, the compression stress occurring with the lens body 28 is as follows: the resin contraction which occurs when the curved portion 28B is solidified acts on the curved portion 28B, but the resin contraction which occurs when the flat portion 28A is solidified does not.

Accordingly, in the curved portion 28B, the compression strain deformation in the longitudinal direction is small which attributes to the aforementioned compression stress, and the deformation of the curved portion 28B in the direction in which the radius of curvature thereof is increased is minimized. This feature prevents the peripheral flange 30 (on the side of the curved portion 28B) of the lens body 28 from being deformed in such a manner that it is shifted from the predetermined position.

In the flat portion 28A which is solidified after the curved portion 28B, the compression strain deformation in the longitudinal direction which is due to the aforementioned compression stress is relatively large; however, since the radius of curvature (in the longitudinal direction of the flat portion 28A is large, even if such a compression strain occurs, the lens body 28 is scarcely changed in configuration, and the peripheral flange is prevented from being deformed upwardly.

As was described above, in the vehicle lamp with the long curved resin lens, the lens body is effectively prevented from being deformed upwardly. Owing to this feature, the sealing of the resin lens 12 and the lamp body 14 is achieved positively.

In the embodiment, the middle wall thickness portion 28C, which is smaller in wall thickness than the flat portion 28A and larger in wall thickness than the curved portion 28B, is provided between the flat portion 28A and the curved portion 28B. Hence, the abrupt change in compression stress between the flat portion 28A and the curved portion 28B can be released. This feature improves the mechanical strength of the resin lens 12.

Furthermore, the middle wall thickness portion 28C is gradually smaller in wall thickness towards the end of the curved portion 28B from the end of the flat portion 28A. Owing to this feature, the abrupt change in compression stress can be more positively released, so that the mechanical strength of the resin lens 12 is further increased. The formation of the middle wall thickness portion 28C as described above prevents the formation of a step between the flat portion 28A and the curved portion 28B, which improves the external appearance of the vehicle lamp 10.

In the embodiment, the reference wall thickness t2 of the curved portion 28 is 2.5 mm (t2=2.5 mm). This value is less than 90% of the reference wall thickness t1 (=3.5 mm) of the flat portion. Therefore, the amount of deformation of the curved portion 28B in the direction in which the latter 28B increases the radius of curvature in the longitudinal direction, can be substantially zeroed; and the lens body 28 is balanced in wall thickness distribution as a whole.

After the injection molding operation, in the metal mold the lens body 28 is solidified after the peripheral flange 30. This is due to the fact the peripheral flange 30 is larger in contact area with the metal mold. On the other hand, the wall thickness of the end portion of the peripheral flange is 1.5 mm, and is smaller in wall thickness than the curved portion 28B (2.5 mm in reference wall thickness). Hence, the peripheral flange 30 is relatively quickly solidified. That is, the construction of the embodiment is effective in the formation of a vehicle lamp.

What is claimed is:

1. A vehicle lamp having a resin lens comprising:

an elongated lens body including a flat portion large in radius of curvature and a curved portion small in radius of curvature with respect to a longitudinal direction of said lens body, said flat and curved portions extending in the longitudinal direction of said lens body such that said flat portion terminates in the longitudinal direction before said curved portion begins; and a peripheral flange formed along a periphery of said lens body, wherein said curved portion is smaller in wall thickness than said flat portion; and wherein said curve portion extends from said flat portion such that a line tangent to a beginning of said curved portion on an outer surface of said curved portion does not cross said flat portion when the tangent line is extended in a direction of said flat portion.

2. The vehicle lamp as claimed in claim 1, wherein said lens body further includes a middle wall thickness portion which is smaller in wall thickness than said flat portion and larger in wall thickness than said curved portion provided between said flat portion and said curved portion.

3. The vehicle lamp as claimed in claim 2, wherein said middle wall thickness portion is gradually smaller in wall thickness towards an end of said curved portion from an end of said flat portion.

4. The vehicle lamp as claimed in claim 3, wherein said lens body and said peripheral flange are one piece formed by molding.

5. The vehicle lamp as claimed in claim 1, wherein the wall thickness of said curved portion is less than 90% of the wall thickness of said flat portion.

6. The vehicle lamp as claimed in claim 1, wherein the wall thickness of said flat portion is at least 2 mm and at most 4 mm.

7. The vehicle lamp as claimed in claim 1, wherein an end portion of said peripheral flange is smaller in wall thickness than said curved portion.

8. The vehicle lamp as claimed in claim 1, wherein said lens body and said peripheral flange are one piece formed by molding.

9. The vehicle lamp according to claim 1, wherein said curved portion extends from said flat portion such that a line tangent to any part of said curved portion on an outer surface of said curved portion does not cross said flat portion when the tangent line is extended in a direction of said flat portion.

10. A resin lens for a vehicle lamp, comprising:

an elongated lens body having a longitudinal length in a longitudinal direction of the lens body, and including a flat portion large in radius of curvature and a curved portion small in radius of curvature with respect to the longitudinal direction of said lens body, and a peripheral flange formed along a periphery of said lens body; and wherein said flat portion extends an entire vertical length of the lens body in a direction perpendicular to the longitudinal direction and along part of the longitudinal length of said lens body so that said flat portion terminates in the longitudinal direction before said curved portion begins; and wherein said curved portion extends the entire vertical length of the lens body in the direction perpendicular to the longitudinal direction and along another part of the longitudinal length of said lens body; and wherein said curved portion is smaller in wall thickness than said flat portion along the entire vertical length of said curved portion.

11. The vehicle lamp as claimed in claim 10, wherein said lens body further includes a middle wall thickness portion which is smaller in wall thickness than said flat portion and larger in wall thickness than said curved portion provided between said flat portion and said curved portion.

12. The vehicle lamp as claimed in claim 11, wherein said middle wall thickness portion is gradually smaller in wall thickness towards an end of said curved portion from an end of said flat portion.

13. The vehicle lamp as claimed in claim 12, wherein said lens body and said peripheral flange are one piece formed by molding.

14. The vehicle lamp as claimed in claim 10, wherein the wall thickness of said curved portion is less than 90% of the wall thickness of said flat portion.

15. The vehicle lamp as claimed in claim 10, wherein the wall thickness of said flat portion is at least 2 mm and at most 4 mm.

16. The vehicle lamp as claimed in claim 10, wherein an end portion of said peripheral flange is smaller in wall thickness than said curved portion.

17. The vehicle lamp as claimed in claim 10, wherein said lens body and said peripheral flange are one piece formed by molding.

18. A vehicle lamp having a resin lens comprising:

an elongated lens body including a flat portion large in radius of curvature and a curved portion small in radius of curvature with respect to a longitudinal direction of said lens body, said flat and curved portions extending in the longitudinal direction of said lens body such that said flat portion terminates in the longitudinal direction before said curved portion begins; and a peripheral flange formed along a periphery of said lens body;

wherein said curved portion is smaller in wall thickness than said flat portion;

wherein said lens body further includes a middle wall thickness portion which is smaller in wall thickness than said flat portion and larger in wall thickness than said curved portion provided between said flat portion and said curved portion; and wherein said middle wall thickness portion is gradually smaller in wall thickness towards an end of said curved portion from an end of said flat portion.

19. The vehicle lamp as claims in claim 18, wherein said lens body and said peripheral flange are one piece formed by molding.

* * * * *